US012326671B2

(12) United States Patent
Nagumo et al.

(10) Patent No.: US 12,326,671 B2
(45) Date of Patent: Jun. 10, 2025

(54) IMAGE CARRIER UNIT AND IMAGE FORMING APPARATUS

(71) Applicant: FUJIFILM BUSINESS INNOVATION CORP., Tokyo (JP)

(72) Inventors: Haruno Nagumo, Kanagawa (JP); Atsushi Kaneko, Kanagawa (JP); Yosuke Ninomiya, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/432,298

(22) Filed: Feb. 5, 2024

(65) Prior Publication Data

US 2025/0021031 A1 Jan. 16, 2025

(30) Foreign Application Priority Data

Jul. 14, 2023 (JP) ................................ 2023-116036

(51) Int. Cl.
*G03G 15/02* (2006.01)

(52) U.S. Cl.
CPC ................................ *G03G 15/0233* (2013.01)

(58) Field of Classification Search
CPC ................................................. G03G 15/0233
USPC ................................... 399/31, 107, 110, 111
See application file for complete search history.

(56) References Cited

U.S. PATENT DOCUMENTS

| | | | | |
|---|---|---|---|---|
| 5,953,560 A * | 9/1999 | Numagami | G03G 21/181 399/111 |
| 7,003,247 B2 * | 2/2006 | Koishi | G03G 21/186 399/116 |
| 7,242,885 B2 * | 7/2007 | Abe | G03G 21/1885 399/90 |
| 2009/0220275 A1 | 9/2009 | Hashimoto | |

FOREIGN PATENT DOCUMENTS

JP 2008-057616 A 3/2008

OTHER PUBLICATIONS

Aug. 1, 2024 Extended Search Report issued in European Patent Application No. 24156183.6.

* cited by examiner

*Primary Examiner* — Hoan H Tran
(74) *Attorney, Agent, or Firm* — Oliff PLC

(57) ABSTRACT

An image carrier unit includes an image carrier configured to carry an image on a surface of the image carrier, a conduction member configured to establish electrical conduction of the image carrier by a contact point with the image carrier, and a shape portion configured to allow viewing of the contact point.

7 Claims, 9 Drawing Sheets

IMAGE CARRIER UNIT AND IMAGE FORMING APPARATUS

CROSS-REFERENCE TO RELATED APPLICATIONS

This application is based on and claims priority under 35 USC 119 from Japanese Patent Application No. 2023-116036 filed Jul. 14, 2023.

BACKGROUND

(i) Technical Field

The present disclosure relates to an image carrier unit and an image forming apparatus.

(ii) Related Art

For example, Japanese Unexamined Patent Application Publication No. 2008-57616 discloses a structure of a rotation shaft support device including substantially hollow cylindrical bearing members that rotatably support a rotation shaft, and holding members to which the bearing members are fixed. The bearing member has a bearing cutaway portion formed by cutting away part of the bearing member. The rotation shaft is attached into the bearing member through the bearing cutaway portion. The holding member has bearing fitting members formed by cutting away part of the holding member. The bearing member having the rotation shaft attached thereto is held in the bearing fitting members.

SUMMARY

Aspects of non-limiting embodiments of the present disclosure relate to the following circumstances. In a process for manufacturing an image carrier unit in which an image carrier that carries an image on its surface is housed in a housing member so that the image carrier is rotatable by a support member, it is necessary to check whether a conduction member for establishing electrical conduction of the image carrier is in contact with the image carrier. If the electrical conduction is not confirmed by a conduction test after assembling, the image carrier unit is disassembled to identify the cause, and whether there is a contact point where the conduction member is in contact with the image carrier is checked. Therefore, the workability decreases. If the contact point is checkable during assembling, it is less likely that the electrical conduction is not confirmed by the conduction test. Therefore, the decrease in workability during the manufacturing process may be suppressed.

Aspects of non-limiting embodiments of the present disclosure therefore relate to easy check on a contact point compared with a structure in which the contact point is not checkable in an assembled state.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image carrier unit comprising: an image carrier configured to carry an image on a surface of the image carrier; a conduction member configured to establish electrical conduction of the image carrier by a contact point with the image carrier; and a shape portion configured to allow viewing of the contact point.

BRIEF DESCRIPTION OF THE DRAWINGS

An exemplary embodiment of the present disclosure will be described in detail based on the following figures, wherein:

FIGS. 9A and 9B illustrate switching of GND conduction from ON to OFF when the photoconductor unit is pulled from the body of the image forming apparatus, in which FIG. 9A illustrates the photoconductor unit housed in the body and FIG. 9B illustrates the photoconductor unit pulled from the body to a position where a cutaway portion is not exposed.

DETAILED DESCRIPTION

Figure 1:
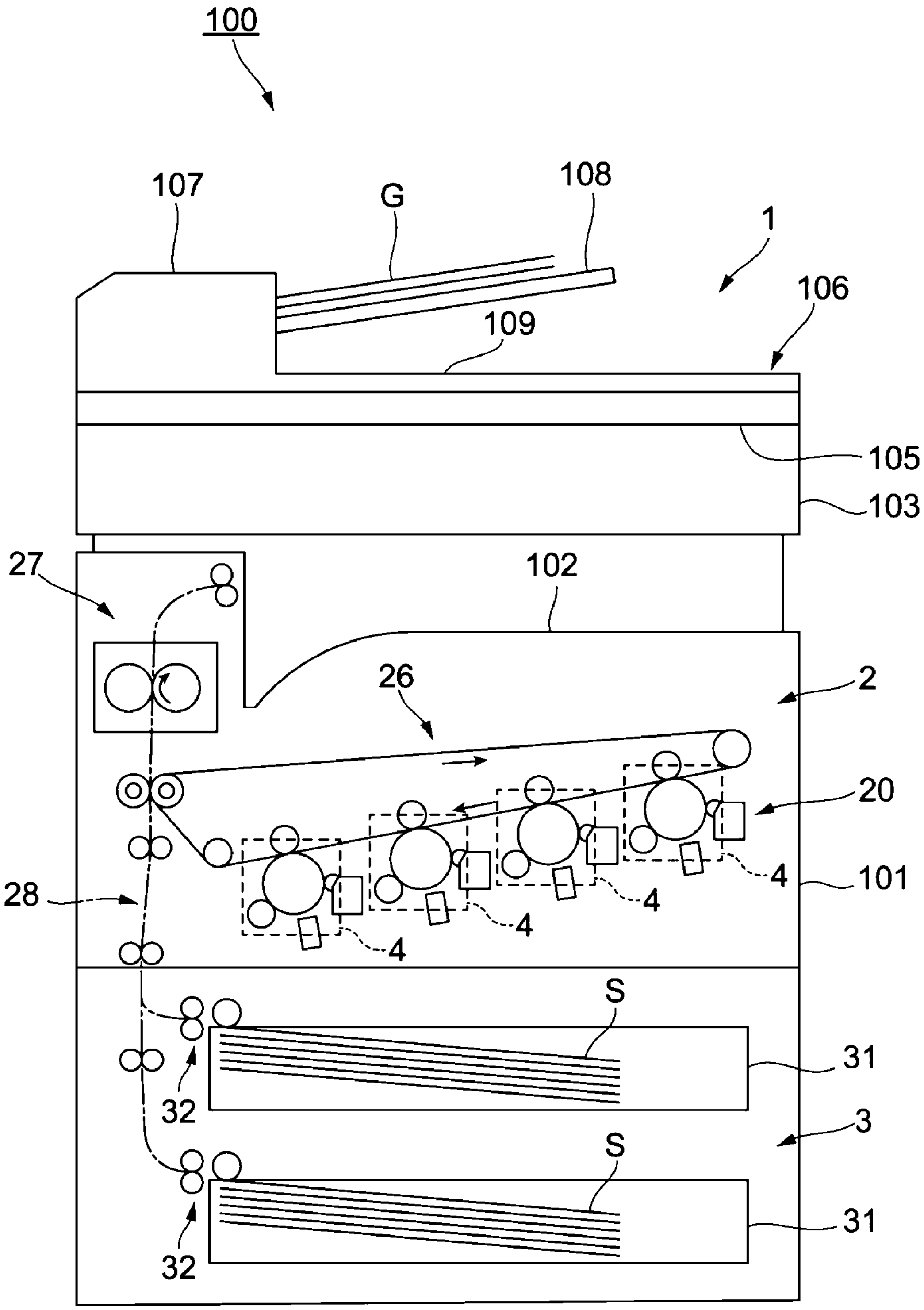
FIG. 1 is a schematic structural diagram of an image forming apparatus according to an exemplary embodiment.

An exemplary embodiment of the disclosure is described in detail below with reference to the accompanying drawings. The sizes and thicknesses of components in the drawings to be referred to in the following description may differ from actual dimensions.

<Image Forming Apparatus 100>

FIG. 1 is a schematic structural diagram of an image forming apparatus 100 according to this exemplary embodiment.

As illustrated in FIG. 1, the image forming apparatus 100 includes a document reading device 1 that reads information on a document G, an image former 2 that forms an image on recording paper S based on the information on the document read by the document reading device 1 (read image), and a paper feeder 3 that sends the recording paper S to be fed to the image former 2. In the image forming apparatus 100, the image former 2 and the paper feeder 3 are housed in a body 101, and the document reading device 1 is disposed above the body 101. The body 101 includes, at its top, an output paper receiver 102 that receives the output recording paper S on which the image is formed.

The document reading device 1 includes a housing 103. The document reading device 1 includes, at the top of the housing 103, a light transmissive document stage 105 on which the document G is placed, and a document cover 106 that covers the document stage 105 and is openable and closable relative to the housing 103. The document cover 106 has an automatic document feeder 107 that transports the document G to a reading position and outputs the read document G, a document tray 108 on which the document G to be sent by the automatic document feeder 107 is placed, and a receiver 109 that receives the document G output by the automatic document feeder 107.

The image former 2 includes an image forming unit 20 that forms yellow (Y), magenta (M), cyan (C), and black (K) toner images by, for example, an electrophotographic system, an intermediate transfer unit 26 that transports the toner images formed by the image forming unit 20 until they are transferred onto the recording paper S, and a fixing unit 27 that fixes the toner images transferred onto the recording paper S from the intermediate transfer unit 26.

The image forming unit 20 includes photoconductor units 4 associated with the individual colors and represented by broken lines. Each photoconductor unit 4 is attachable to and removable from the body 101 by a user.

The paper feeder 3 includes drawable containers 31 that contain a plurality of sheets of recording paper S in preset sizes, types, etc., and feeding devices 32 that send the sheets of recording paper S contained in the containers 31 one by one to transport paths. A feeding and transport path 28 is provided between the paper feeder 3 and the image former 2 to transport the recording paper S sent from the paper feeder 3 to a second transfer position.

Next, a basic operation of the image forming apparatus 100 is described.

In the document reading device 1, the user places the document G on the document stage 105 or the document tray 108. When the user operates an operation button (not illustrated) etc. and the document reading device 1 receives a document reading instruction, the document reading device 1 starts an operation of reading the document G. That is, the document reading device 1 acquires read information on the document G. The image former 2 performs an image forming operation based on the read information on the document G received from the document reading device 1. In synchronization with the operation of the image former 2, the paper feeder 3 sends out the recording paper S. After the toner images are fixed by the image former 2, the recording paper S is output to the output paper receiver 102. The image forming operation is repeated for the number of documents G or the number of images to be formed.

Next, the image forming unit 20 according to this exemplary embodiment is described with reference to FIG. 2. More specifically, each photoconductor unit 4 constituting the image forming unit 20 is described. The photoconductor unit 4 is an example of an image carrier unit.

Figure 2:
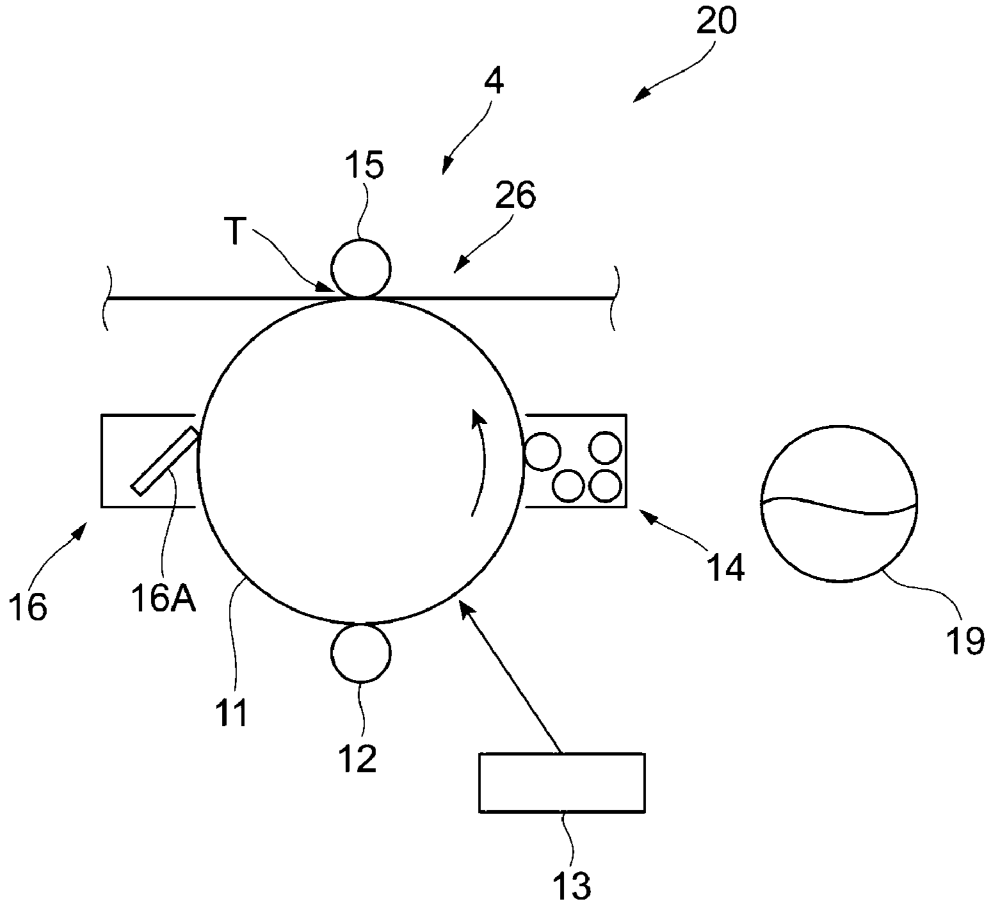
FIG. 2 illustrates the structure of a photoconductor unit.

FIG. 2 illustrates the structure of the photoconductor unit 4 that is viewed from the front side of the image forming apparatus 100.

As illustrated in FIG. 2, the photoconductor unit 4 includes a photoconductor drum 11 that rotates in an arrow direction. The photoconductor unit 4 includes a charging roller 12, an exposing device 13, a developing device 14, a transfer roller 15, and a cleaning device 16 as members disposed around the photoconductor drum 11. The photoconductor unit 4 may have all of these members but part of the members may be omitted.

The photoconductor drum 11 is a cylinder. A photoconductive layer (not illustrated) is formed on the surface of the cylinder.

The charging roller 12 is a conductive rubber roller etc. and charges the photoconductor drum 11.

The exposing device 13 irradiates the photoconductor drum 11 charged by the charging roller 12 with light from a laser light source, a light emitting diode (LED) light source, etc. to form an electrostatic latent image on the surface of the photoconductor drum 11.

The developing device 14 causes a toner to adhere to the surface of the photoconductor drum 11 to develop the electrostatic latent image formed on the photoconductor drum 11 with the toner in a predetermined color. In this way, a toner image is formed on the surface of the photoconductor drum 11 in this exemplary embodiment.

The developing device 14 contains a developer. In this exemplary embodiment, the developer is a so-called two-component developer composed of a magnetic carrier and a colored toner.

In this exemplary embodiment, a developer container 19 contains the developer to be supplied to the developing device 14. In this exemplary embodiment, a new developer is supplied from the developer container 19 to the developing device 14 through a developer transport path (not illustrated).

The transfer roller 15 is a conductive rubber roller etc.

In this exemplary embodiment, the transfer roller 15 and the photoconductor drum 11 face each other to define a transfer portion T. A transfer bias is applied to the transfer roller 15. The toner image on the surface of the photoconductor drum 11, that is, the toner image carried by the photoconductor drum 11 is transferred onto a belt of the intermediate transfer unit 26 at the transfer portion T.

The cleaning device 16 includes a contact member 16A disposed in contact with the photoconductor drum 11, and removes adherents such as a toner on the photoconductor drum 11.

Next, a specific structure of the photoconductor unit 4 is described.

Figure 3:
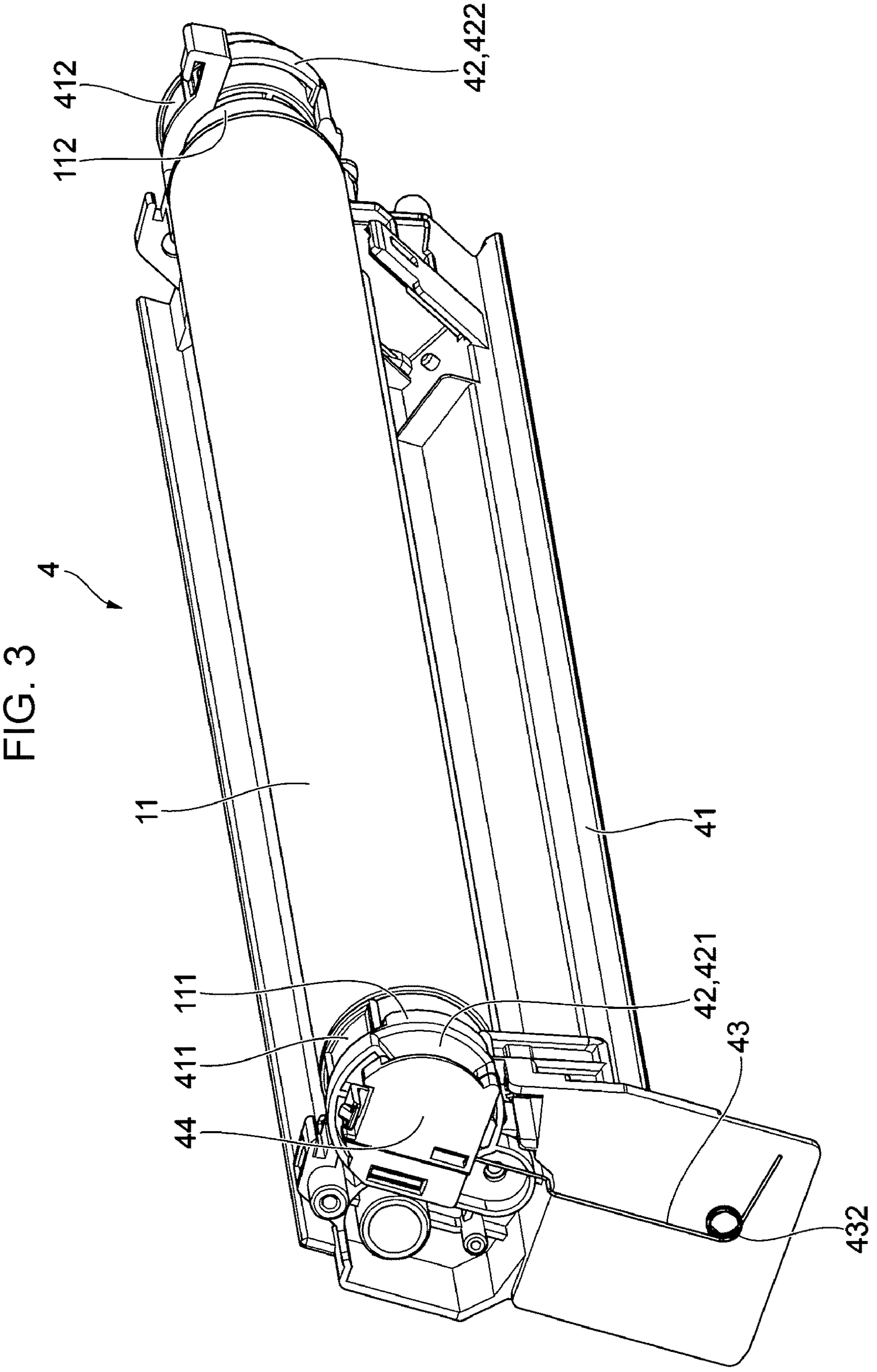
FIG. 3 is a perspective view illustrating the photoconductor unit.

FIG. 3 is a perspective view illustrating the photoconductor unit 4.

The photoconductor unit 4 illustrated in FIG. 3 includes a housing 41, bearings 42, a conduction member 43, and a cover 44 in addition to the photoconductor drum 11.

The housing 41 is a member serving as the body of the photoconductor unit 4, and supports the members such as the photoconductor drum 11. More specifically, the housing 41 includes support pieces 411 and 412 that support one end 111 and another end 112 of the photoconductor drum 11. In FIG. 3, the one end 111 of the photoconductor drum 11 is positioned at the left, and the other end 112 of the photoconductor drum 11 is positioned at the right.

The bearings 42 are resin members provided to the support pieces 411 and 412 of the housing 41. More specifically, the bearings 42 are a bearing 421 associated with the support piece 411, and a bearing 422 associated with the support piece 412. The bearings 421 and 422 are separate members.

That is, the bearing 421 is attached to the one end 111 of the photoconductor drum 11 at the support piece 411, and the bearing 422 is attached to the other end 112 of the photoconductor drum 11 at the support piece 412.

In this way, the one end 111 of the photoconductor drum 11 is rotatably supported by the support piece 411 via the bearing 421, and the other end 112 of the photoconductor drum 11 is rotatably supported by the support piece 412 via the bearing 422.

The bearing 421 is an example of a support member. The housing 41 is an example of a housing member and an example of a positioning member.

The conduction member 43 is a wire in contact with a contact member 113 (see FIG. 4) of the photoconductor drum 11 for ground (GND) conduction. In this exemplary embodiment, the conduction member 43 is provided near the one end 111 of the photoconductor drum 11 (left in FIG. 3).

The conduction member 43 includes a spring portion 431 (see FIG. 7) in contact with a contact point 114 (see FIG. 4) of the contact member 113, and an attachment portion 432 attached to the housing 41.

The cover 44 is a resin member that covers the spring portion 431 of the conduction member 43. The cover 44 is provided near the support piece 411 of the housing 41 where the conduction member 43 is provided, but may be provided near the support piece 412.

The structure of the photoconductor unit 4 according to this exemplary embodiment is described below with reference to FIGS. 4 to 7.

Figure 4:
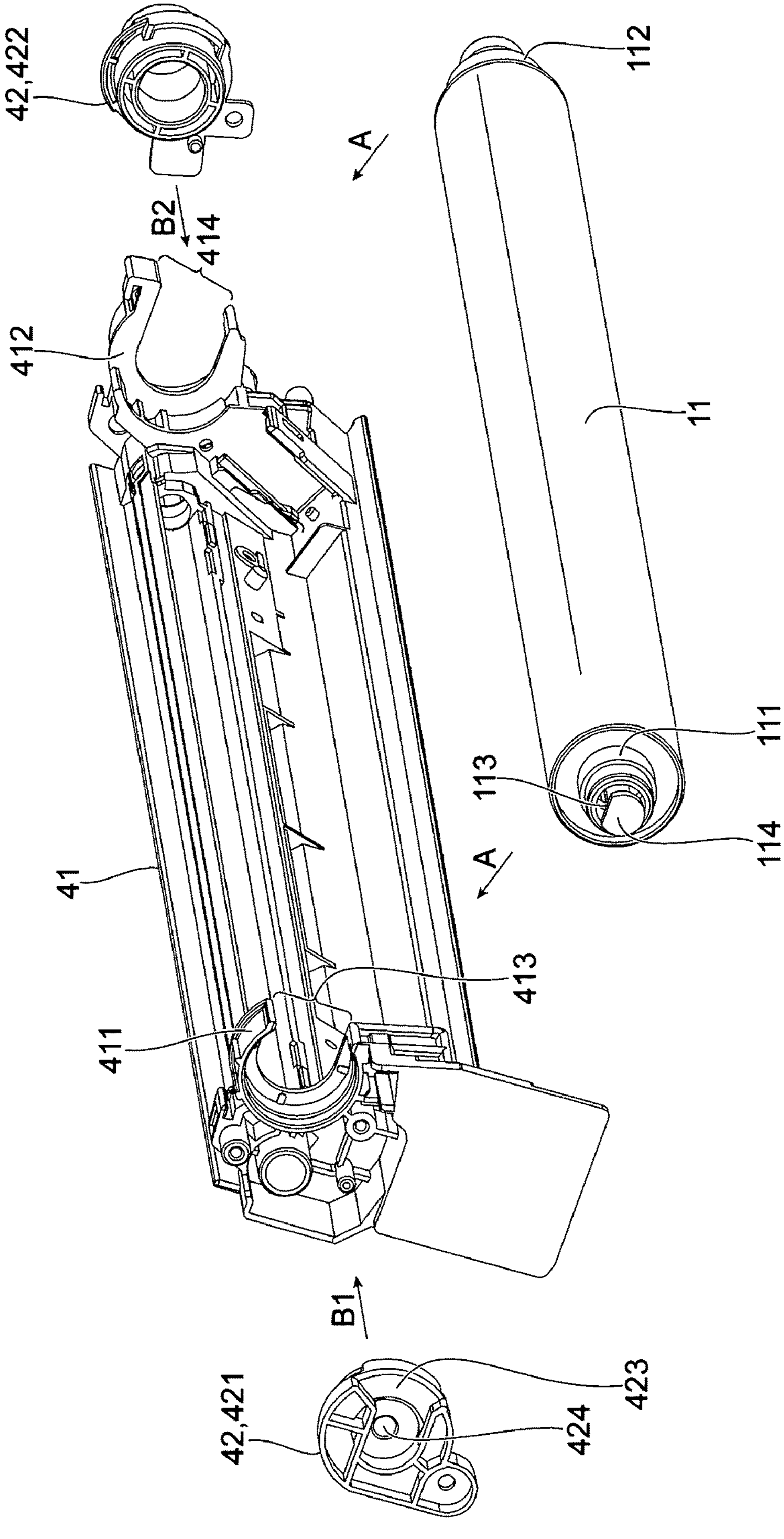
FIG. 4 is an exploded perspective view illustrating a procedure for assembling the photoconductor unit.
Figure 5:
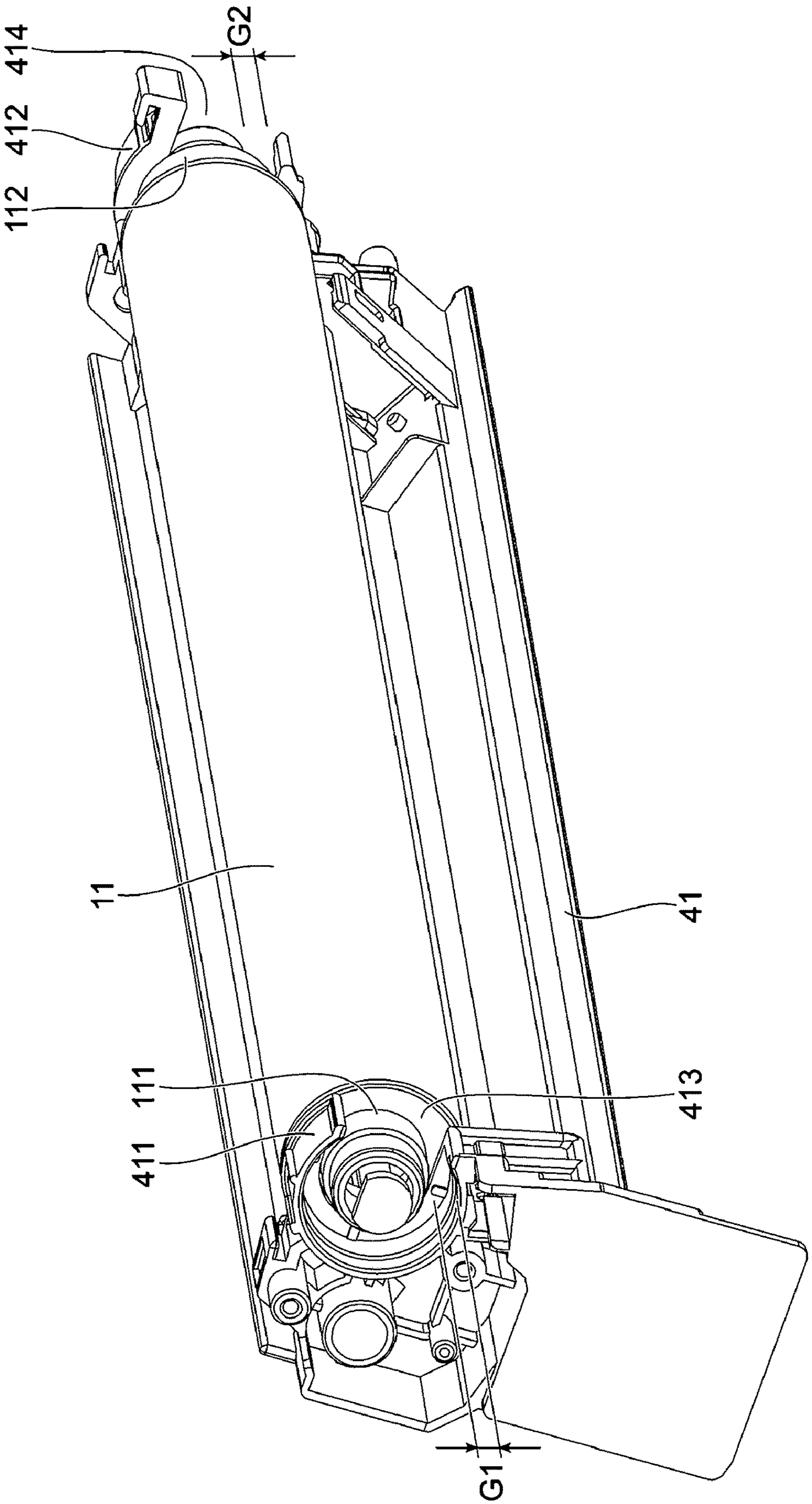
FIG. 5 is a perspective view illustrating how the photoconductor unit is assembled.
Figure 6:
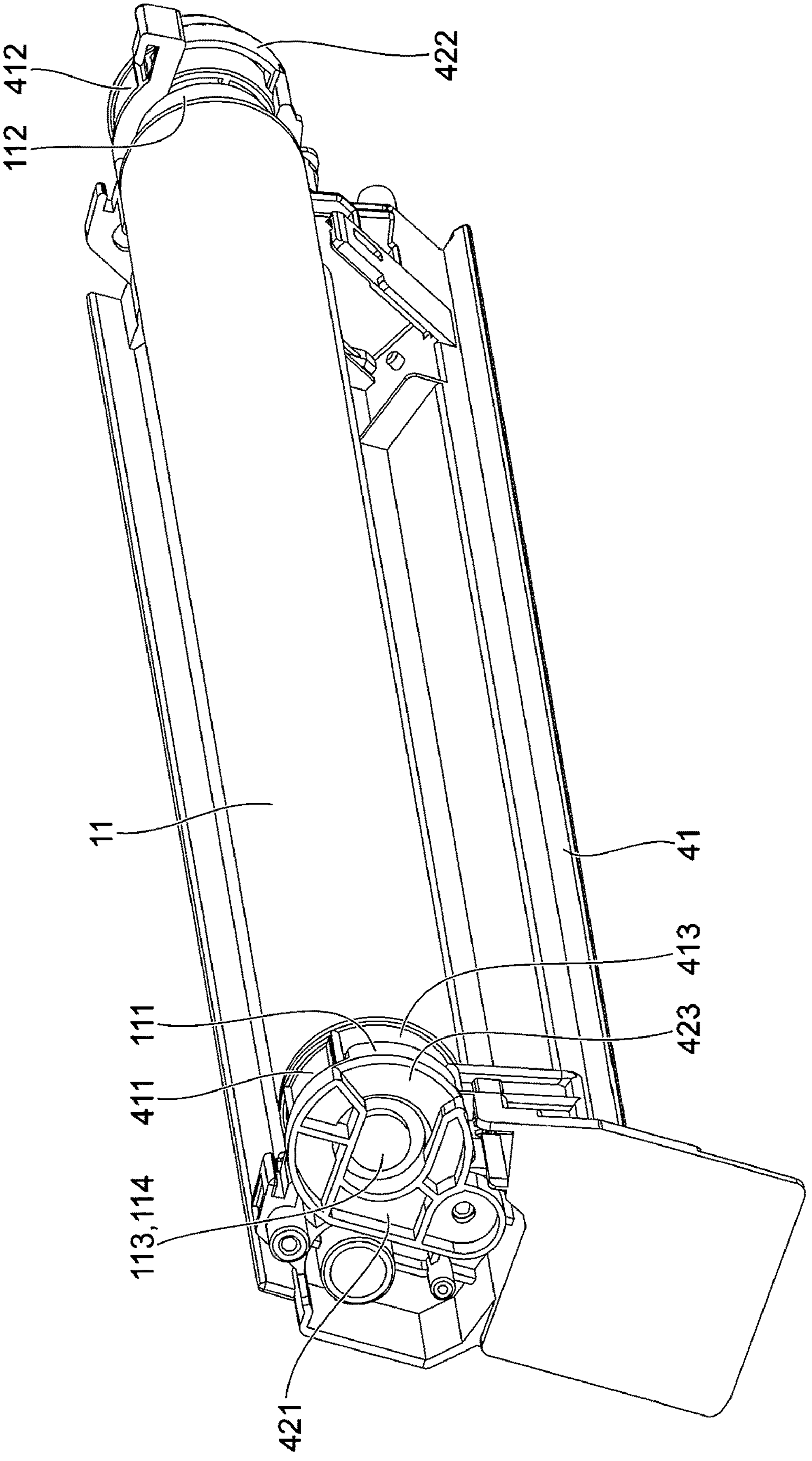
FIG. 6 is a perspective view illustrating how the photoconductor unit is assembled.
Figure 7:
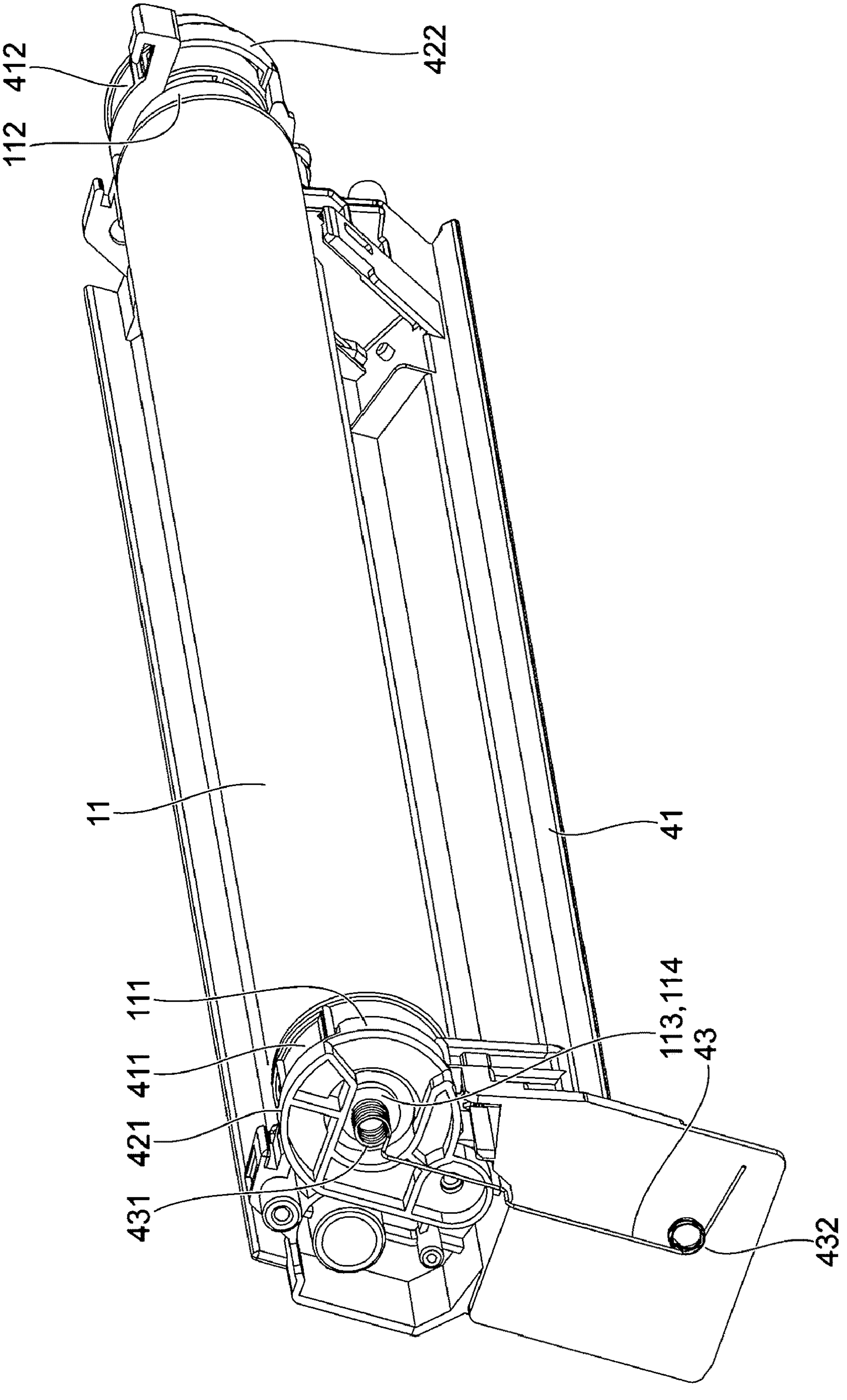
FIG. 7 is a perspective view illustrating how the photoconductor unit is assembled.

FIG. 4 is an exploded perspective view illustrating a procedure for assembling the photoconductor unit 4. FIG. 4 illustrates the photoconductor drum 11, the housing 41, and the bearings 42 (421, 422). FIGS. 5 to 7 are perspective views illustrating how the photoconductor unit is assembled.

As illustrated in FIG. 4, the support pieces 411 and 412 of the housing 41 are positioned at the ends of the housing 41. The support pieces 411 and 412 are annular portions having cutaway portions in part. More specifically, the support piece 411 has a cutaway portion 413, and the support piece 412 has a cutaway portion 414. The cutaway portion 413 of the support piece 411 and the cutaway portion 414 of the support piece 412 are oriented in the same direction.

The opening lengths of the cutaway portions 413 and 414 of the housing 41 are smaller than the diameter of the photoconductor drum 11. The support pieces 411 and 412 have inner peripheral surfaces adapted to the outer diameters of the bearings 421 and 422. The support pieces 411 and 412 are deformable and the circumferential lengths of the cutaway portions 413 and 414 are changeable.

The photoconductor drum 11 is housed in the housing 41 in a lateral direction A by using the cutaway portions 413 and 414 of the support pieces 411 and 412. That is, the one end 111 of the photoconductor drum 11 is inserted into the support piece 411 through the cutaway portion 413 of the support piece 411, and the other end 112 of the photoconductor drum 11 is inserted into the support piece 412 through the cutaway portion 414 of the support piece 412.

The lateral direction A is an example of a housing direction. The housing direction refers to a direction in which the photoconductor drum 11 is housed in the housing 41 that houses the photoconductor drum 11, and may also refer to a direction in which the photoconductor drum 11 is attached.

As described above, the bearings 421 and 422 are the members that support the photoconductor drum 11. The bearing 421 is positioned in the circumferential direction relative to the housing 41 by the support piece 411, and the bearing 422 is positioned in the circumferential direction relative to the housing 41 by the support piece 412. In other words, the housing 41 includes the support piece 411 serving as a positioning member that positions the bearing 421 relative to the housing 41, and the support piece 412 serving as a positioning member that positions the bearing 422 relative to the housing 41.

The support piece 411 has the cutaway portion 413, and the support piece 412 has the cutaway portion 414. The cutaway portions 413 and 414 are provided at the same position relative to the lateral direction A.

As described above, the support piece 411 is an example of the positioning member that positions the bearing 421 relative to the housing 41. The term "member" herein refers to, for example, a member in a case where the support piece 411 and the housing 41 are separate members and the support piece 411 is attached to the housing 41, and a member in a case where the support piece 411 is integrated with the housing 41.

Focusing on the support piece 411 of the housing 41, the inner diameter of the support piece 411 does not correspond to the outer diameter of the one end 111 of the photoconductor drum 11. More specifically, the outer diameter of the one end 111 of the photoconductor drum 11 is smaller than the inner diameter of the support piece 411. Therefore, as illustrated in FIG. 5, the outer peripheral surface of the one end 111 is not in close contact with the inner peripheral surface of the support piece 411, and a clearance G1 is secured in the circumferential direction between the support piece 411 and the one end 111.

The same applies to the support piece 412 of the housing 41. The outer diameter of the other end 112 of the photoconductor drum 11 is smaller than the inner diameter of the support piece 412. Therefore, as illustrated in FIG. 5, a clearance G2 is secured in the circumferential direction between the support piece 412 and the other end 112.

The description is continued referring back to FIG. 4. The bearing 421 is attached in an axial direction B1 to the one end 111 of the photoconductor drum 11 housed in the housing 41. Similarly, the bearing 422 is attached in an axial direction B2 to the other end 112 of the photoconductor drum 11 housed in the housing 41.

In the state in which the photoconductor drum 11 and the bearings 421 and 422 are housed in the housing 41, the photoconductor drum 11 is rotatably held via the bearings 421 and 422 as illustrated in FIG. 6.

Referring to FIG. 6, the contact member 113 of the photoconductor drum 11 is exposed. As described above, the contact member 113 is provided for ground (GND) conduction, and is connected to the conduction member 43 (see FIG. 3).

The contact member 113 is detached from the photoconductor drum 11 before the bearing 421 is attached to the one end 111 of the photoconductor drum 11, and is attached to the one end 111 of the photoconductor drum 11 through a through hole 424 (see FIG. 4) of the bearing 421 in the axial direction B1 after the bearing 421 is attached to the one end 111 in the axial direction B1.

As illustrated in FIG. 4, the bearing 421 has a cutaway portion 423. The cutaway portion 423 is formed to reduce the thickness in the same direction as the axial direction B1 in FIG. 4.

The cutaway portion 423 extends in a radial direction from the through hole 424. As illustrated in FIG. 6, the cutaway portion 423 of the bearing 421 is oriented in the same direction as that of the cutaway portion 413 of the support piece 411.

More specifically, when the bearing 421 is positioned relative to the housing 41, the circumferential position of the cutaway portion 423 is substantially the same as that of the cutaway portion 413 of the support piece 411.

The term "same direction" does not herein mean "totally the same direction," and may have such a deviation that the workability does not decrease when the contact point 114 is checked by sight through the cutaway portion 423 at the time of assembling. The cutaway portion 423 of the bearing 421 is an example of a shape portion.

In the state in which the photoconductor drum 11 and the bearings 421 and 422 are housed in the housing 41, the conduction member 43 is attached so that the spring portion 431 comes into contact with the contact point 114 of the contact member 113 as illustrated in FIG. 7. The attachment portion 432 of the conduction member 43 is attached to the housing 41.

The photoconductor drum 11 and the contact member 113 are examples of an image carrier.

The cover 44 is attached in the state illustrated in FIG. 7, thereby obtaining the assembled photoconductor unit 4 illustrated in FIG. 3. Access to the contact point 114 in the photoconductor unit 4 is described with reference to FIG. 8.

Figure 8:
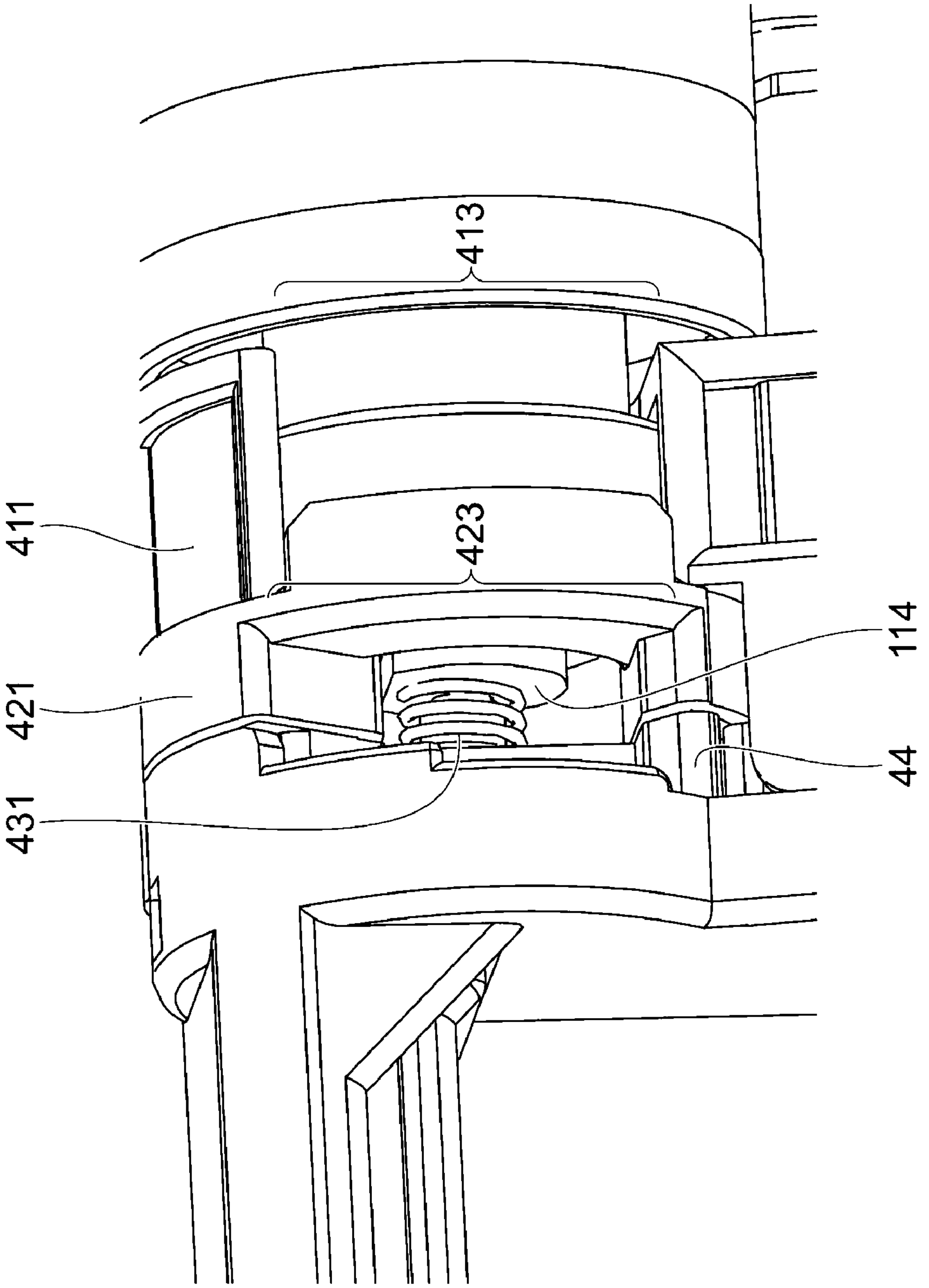
FIG. 8 is a perspective view illustrating access to a contact point in the assembled photoconductor unit.

FIG. 8 is a perspective view illustrating access to the contact point 114 in the assembled photoconductor unit 4.

In the work of assembling the photoconductor unit 4, the cutaway portion 423 of the bearing 421 is oriented in the same direction as that of the cutaway portion 413 of the housing 41. In other words, the cutaway portion 423 of the bearing 421 is oriented in the same direction as the lateral direction A (see FIG. 4).

It is appropriate that the cutaway portion 423 of the bearing 421 be formed so that the contact point 114 (see FIG. 4) may be viewed during the assembling work. In this exemplary embodiment, the cutaway portion 423 is provided up to the contact point 114 (see FIG. 4).

In this exemplary embodiment, the cutaway portion 413 of the housing 41 and the cutaway portion 423 of the bearing 421 are oriented in the same direction, that is, in the lateral direction A (see FIG. 4) as illustrated in FIG. 8, but this structure is not limitative. The cutaway portion 413 of the housing 41 and the cutaway portion 423 of the bearing 421 may be oriented in different directions within a deviation of, for example, 90 degrees.

Figure 9A:
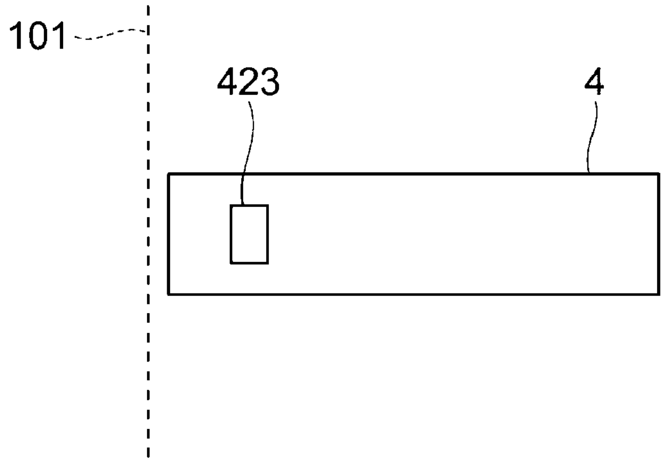
Figure 9B:
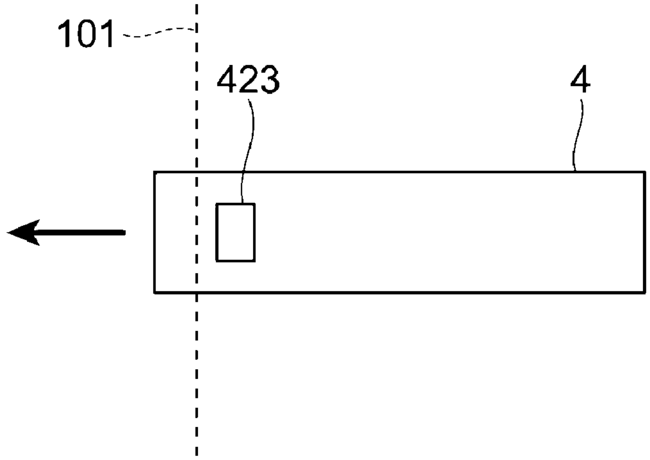

FIGS. 9A and 9B illustrate switching of ground (GND) conduction from ON to OFF when the photoconductor unit 4 is pulled from the body 101 of the image forming apparatus 100. FIG. 9A illustrates the photoconductor unit 4 housed in the body 101. FIG. 9B illustrates the photoconductor unit 4 pulled from the body 101 to a position where the cutaway portion 423 is not exposed.

In the state in which the photoconductor unit 4 is housed in the body 101 as illustrated in FIG. 9A, the GND conduction is ON. When the photoconductor unit 4 is pulled from the body 101 as illustrated in FIG. 9B, the GND conduction is turned OFF, and the cutaway portion 423 is exposed by further pulling the photoconductor unit 4.

In this exemplary embodiment, when the photoconductor unit 4 is pulled from the body 101, the GND conduction is turned OFF before the cutaway portion 423 is exposed.

The GND conduction may mechanically be switched ON and OFF depending on the position of the photoconductor unit 4, or may be switched ON and OFF by control based on detection results from a position sensor.

When the photoconductor unit 4 is attached to the body 101 of the image forming apparatus 100, the GND conduction is switched OFF to ON in response to insertion of the photoconductor unit 4 into the body 101 to a position where the cutaway portion 423 is not exposed (see FIG. 9B).

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The exemplary embodiments were chosen and described in order to best explain the principles of the disclosure and its practical applications, thereby enabling others skilled in the art to understand the disclosure for various exemplary embodiments and with the various modifications as are suited to the particular use contemplated. It is intended that the scope of the disclosure be defined by the following claims and their equivalents.

APPENDIX (((1)))

An image carrier unit comprising:

an image carrier configured to carry an image on a surface of the image carrier;

a conduction member configured to establish electrical conduction of the image carrier by a contact point with the image carrier; and a shape portion configured to allow viewing of the contact point.

(((2)))

The image carrier unit according to (((1))), wherein the shape portion is oriented in the same direction as a housing direction in which the image carrier is housed in a housing member that houses the image carrier.

(((3)))

The image carrier unit according to (((2))), wherein a positioning member that positions, relative to the housing member, a support member that supports the image carrier is cut away at a predetermined position relative to the housing direction.

(((4)))

The image carrier unit according to any one of (((1))) to (((3))), wherein the shape portion is cut away up to a position of the contact point in a direction of a rotation shaft of the image carrier.

(((5)))

The image carrier unit according to any one of (((1))) to (((4))), wherein the conduction member is configured to, when the image carrier unit is pulled from an image forming apparatus to which the image carrier unit is attached, cut off the electrical conduction of the image carrier before the shape portion is exposed from the image forming apparatus.

(((6)))

An image forming apparatus comprising:

an image former configured to form an image; and an image carrier unit that constitutes the image former and is insertable into and removable from an apparatus body including the image former, wherein the image carrier unit comprises:

an image carrier configured to carry an image on a surface of the image carrier, a conduction member configured to establish electrical conduction of the image carrier by a contact point with the image carrier; and a shape portion configured to allow viewing of the contact point.

What is claimed is:

1. An image carrier unit comprising:

an image carrier configured to carry an image on a surface of the image carrier;

a conduction member configured to establish electrical conduction of the image carrier by a contact point with the image carrier; and a shape portion configured to allow viewing of the contact point.

2. The image carrier unit according to claim 1, wherein the shape portion is oriented in the same direction as a housing direction in which the image carrier is housed in a housing member that houses the image carrier.

3. The image carrier unit according to claim 2, wherein a positioning member that positions, relative to the housing member, a support member that supports the image carrier is cut away at a predetermined position relative to the housing direction.

4. The image carrier unit according to claim 1, wherein the shape portion is cut away up to a position of the contact point in a direction of a rotation shaft of the image carrier.

5. The image carrier unit according to claim 1, wherein the conduction member is configured to, when the image carrier unit is pulled from an image forming apparatus to which the image carrier unit is attached, cut off the electrical conduction of the image carrier before the shape portion is exposed from the image forming apparatus.

6. An image forming apparatus comprising:

an image former configured to form an image; and an image carrier unit that constitutes the image former and is insertable into and removable from an apparatus body including the image former, wherein the image carrier unit comprises:

an image carrier configured to carry an image on a surface of the image carrier;

a conduction member configured to establish electrical conduction of the image carrier by a contact point with the image carrier; and a shape portion configured to allow viewing of the contact point.

7. An image carrier unit comprising:

image carrying means for carrying an image on a surface of the image carrying means;

conduction means for establishing electrical conduction of the image carrying means by a contact point with the image carrying means; and shape means for allowing viewing of the contact point.

* * * * *